United States Patent [19]

Marchetto et al.

[11] Patent Number: 5,414,734
[45] Date of Patent: May 9, 1995

[54] COMPENSATION FOR MULTI-PATH INTERFERENCE USING PILOT SYMBOLS

[75] Inventors: Robert F. Marchetto, Burnaby; Todd A. Stewart, Vancouver; Paul K.-M. Ho, Surrey, all of Canada

[73] Assignee: Glenayre Electronics, Inc., Charlotte, N.C.

[21] Appl. No.: 1,061

[22] Filed: Jan. 6, 1993

[51] Int. Cl.⁶ .................. H04L 1/02; H04L 25/08; H04B 1/10; H04B 15/00
[52] U.S. Cl. ..................... 375/267; 375/285; 375/346; 375/347; 375/350
[58] Field of Search ............. 375/99, 100, 102, 40, 375/58, 94, 103, 12, 14, 11; 455/303, 304, 306, 65, 521; 364/724.1, 577; 370/110.1, 110.2, 110.3, 110.4

[56] References Cited

U.S. PATENT DOCUMENTS

| | | | |
|---|---|---|---|
| 2,858,529 | 10/1958 | Black et al. | 340/248 |
| 3,717,814 | 2/1973 | Gans | 325/56 |
| 4,146,838 | 3/1979 | Takada | 325/3 |
| 4,675,880 | 6/1987 | Davarian | 375/39 |
| 5,018,166 | 5/1991 | Tiahjadi et al. | 375/106 |
| 5,091,918 | 2/1992 | Wales | 375/99 |
| 5,109,390 | 3/1992 | Gilhousen et al. | 375/40 |
| 5,127,051 | 6/1992 | Cham et al. | 455/65 |
| 5,140,615 | 8/1992 | Tasker et al. | 375/100 |
| 5,170,413 | 12/1992 | Hess et al. | 375/100 |
| 5,191,598 | 3/1993 | Bäckström et al. | 375/100 |

OTHER PUBLICATIONS

"Adaptive Equalization and Diversity Combining for a Mobile Radio Channel", 1990 IEEE, Lo et al. pp. 507A.2.1–2.5.

Cavers, James K., "An Analysis of Pilot Symbol Assisted Modulation for Rayleigh Fading Channels," IEEE Transactions on Vehicular Technology, vol. 40, No. 4, Nov. 1991, ©1991 IEEE, pp. 686–693.

Lo, Norm W. K. Falconer, David D., and Sheikh, Asrar U. H., "Adaptive Equalization and Diversity Combining for a Mobile Radio Channel," ©1990, IEEE, pp. 923–927.

Moher, Michael L. and Lodge, John H., "TCMP –A Modulation and Coding Strategy for Rician Fading Channels," Reprinted from IEEE Journal on Selected Areas in Communications, vol. 7, No. 9, Dec. 1989, ©1989, pp. 1347–1355 plus cover page.

*Primary Examiner*—Stephen Chin
*Assistant Examiner*—Tesfaldet Bocure
*Attorney, Agent, or Firm*—Christensen, O'Connor, Johnson & Kindness

[57] ABSTRACT

A method and apparatus for compensating fading and interference in a radio signal. A plurality of pilot symbols are appended to a plurality of data symbols to form successive frames that are modulated at a transmitter. The transmitted modulated signal is subject to loss of data due to simple fading and multi-path and simulcast interference. The received signals are demodulated by a receiver and processed to provide a data signal comprising the data symbols and a pilot signal comprising the pilot symbols. The data signal is delayed for sufficient time to enable channel impulse response estimates to be made of successive blocks of pilot symbols, preferably using pilot symbol blocks that both precede and follow the data symbols in the frame being processed. The channel impulse response estimates for blocks of pilot symbols are buffered and used by an interpolator to determine an interpolated channel impulse response estimate for each data symbol as a function of both the pilot symbols and of predefined channel characteristics. The interpolated channel impulse response estimates are applied to successive data symbols in the delayed data signal, enabling the data to be decoded, compensating for fading and interference. Interpolation using predefined channel characteristics based on worst case conditions substantially improves the bit error rate (BER) for the data recovered, compared to the prior art.

22 Claims, 8 Drawing Sheets

COMPENSATION FOR MULTI-PATH INTERFERENCE USING PILOT SYMBOLS

FIELD OF THE INVENTION

The present invention generally relates to apparatus and a method for minimizing the effects of multi-path and simulcast interference on a radio signal, and more specifically, to apparatus and a method for using pilot symbols to determine the effects of propagation on a received radio signal.

BACKGROUND OF THE INVENTION

Radio signals are subject to several propagation phenomena that greatly impact on the strength of the signal at a receiver. If the signal reflects from buildings or other man-made or natural surfaces, the reflected signal, which follows a different, longer path than a direct signal, can arrive at the receiver out of phase with the direct signal; the resulting interference between the two or more signals reduces the signal strength at the receiver. This phenomenon is multi-path interference.

A related type of interference arises in simulcast paging systems wherein the same signal is broadcast from a plurality of transmitters. A receiver disposed in a zone where identical transmitted signals from two or more transmitting stations overlap can experience a reduction in the strength of the overall received signal, due to a destructive interference that occurs when the radio signals received from the different transmitters are summed together, since the propagation distance, and therefore, the phase of the signals can be quite different. Simulcast interference is thus similar in its effect, but differs from multi-path interference in that the former involves interference between signals from different transmitters, while the latter involves interference between signals from the same transmitter that travel along different propagation paths. In addition, since it is virtually impossible to precisely set the transmit center RF carrier frequencies of the overlapping transmissions, the receiver in a simulcast paging system experiences an additional distortion problem that is not evident in multi-path interference of signals transmitted from a single transmitter. In flat fading, the frequency response of the received signal is flat and only the gain and phase fluctuate.

Flat fading represents yet another phenomenon by which received signal strength can be diminished. However, when flat fading occurs, only a signal from one transmitter is involved, and this signal is propagated without reflection, directly to the receiver.

To mitigate the effects of multi-path interference at the receiver, multi-level low baud rate transmissions are sometimes employed. This technique tries to minimize the effect of multi-path distortion by making the relative time/phase difference in the received multi-path signals relatively small compared to the data baud rate. The most significant drawback of this approach is its limitation on data rate, which causes poor system performance. Further, the bit error rate (BER) of the received signal suffers, even when a relatively strong received signal is available, and the modulation of a signal at multiple levels is complicated by the need to split the signal into different sub-bands, which increases processor loading. Use of multi-level, low baud rate modulation techniques is discussed in "MTEL Petition for Rule Making to Allocate Frequencies for New Nationwide Wireless Network Services," a petition submitted to the FCC on Nov. 12, 1991.

Another technique applied to reduce the effect of multi-path interference is the use of equalizers, including fast Kalman equalizers that attempt to rapidly track and converge on dynamically changing conditions. However, this technique has previously not been proposed for use in a simulcast system. Conventional equalizers are relatively slow in adapting to distortion, causing a relatively high BER until the equalizer properly converges. Although faster Kalman equalizers can reduce this problem, the algorithm employed in the devices is so computationally complicated that it requires significant processing overhead. Also, the algorithm employed in Kalman equalizers is somewhat unstable. In fact, when rapid fading occurs due to multi-path distortion, equalizers tend to become unstable and are more likely to fail. A textbook entitled Digital Communications, 2nd edition, by J. Proakis, published by McGraw Hill in 1989, describes the use of equalizers for this purpose in Chapter 6, pages 519 through 693.

Use of pilot symbol assisted modulation (PSAM) is a technique well known in the prior art for minimizing the effect of flat fading, and is particularly effective for use with mobile receivers. Several references describe how BER caused by flat fading can be substantially reduced using pilot symbols, including, for example, "An Analysis of Pilot Symbol Assisted Modulation for Rayleigh Fading Channels," by J. K. Cavers, in IEEE Transactions on Vehicular Technology, Vol. 40, No. 4, November 1991, and "TCMP—A Modulation and Coding Strategy for Rician Fading Channels," IEEE Journal on Selected Areas of Communications, L. Moher and J. H. Lodge, Vol. 7, pp. 1347–1355, December 1989. This technique uses a single pilot symbol in each frame transmitted. These references only discuss the use of pilot symbols in connection with reducing the fading of a single ray following a direct path from a single transmitter site and do not teach or suggest how pilot symbols might be used to deal with multi-path or simulcast interference problems.

A paper entitled "Adaptive Equalization and Diversity Combining for a Mobile Radio Channel," by N. Lo, D. Falconer, and A. Sheikh, Proc. IEEE Globecom '90, December 1990, discloses a digital cellular radio system, which employs a jointly adaptive decision-feedback equalizer and diversity combiner to mitigate Doppler fading rates up to 100 Hz. As disclosed in this reference, current estimates of channel impulse response are interpolated and the interpolated values applied to successive data symbols in blocks of data, to compensate for changes in the channel impulse response with time. The technique provides for transmitting a plurality of predefined pilot symbols before each block of data and interpolating the estimated channel impulse response for the symbols received before and after each block of data. The interpolation attempts to minimize the effect of relatively fast Doppler fading on the data. However, this approach achieves only a modest performance gain, because it fails to consider channel conditions, such as relative signal strength of the received signals, the Doppler fading frequency, propagation delay differences between the interfering signals, frequency offsets between the interfering signals, and the signal-to-noise ratio of the received signals, when carrying out the interpolation process. Consequently, the method disclosed in this paper can not provide an optimal compensation under extreme signal fading conditions for the channel.

Accordingly, it should be evident that compensation for multi-path and simulcast interference is required that enables high-speed data transfer. The prior art systems are either limited to low data rates, have too high a BER, require too much processing overhead, or fail to provide optimal mitigation of the fading problem.

SUMMARY OF THE INVENTION

In accordance with the present invention, a radio system is defined for compensating a receiver for fading of signal propagating from at least one transmitter to the receiver as frames of data. The radio system comprises pilot symbol generation means, coupled to transmitters in the radio system, for providing a predefined plurality of pilot symbols in each frame of data transmitted to the receiver. Separating means, coupled to the receiver for input of a received signal, separate the plurality of pilot symbols from a plurality of data symbols in each frame of data, producing a pilot symbol signal comprising the plurality of pilot symbols and a data signal comprising the plurality of data symbols. Delay means, coupled to receive the data signal, delay the data signal from a current frame until after the pilot symbol signal from at least one subsequent frame is received, producing a delayed data signal. Pilot signal processing means, which are coupled to receive the pilot symbol signal, are provided for determining an estimated channel impulse response for the plurality of pilot symbols in each frame of the received signal. Interpolation filter means, coupled to receive the estimated channel impulse response for each frame of data include storage means for storing an estimated channel impulse response from at least one prior frame. The interpolation filter means interpolate values of the estimated channel impulse response between the current and prior frames to determine, as a function of predefined channel characteristics, an interpolated channel impulse response for each data symbol in a frame. Decoder means, coupled to receive the interpolated channel impulse response and the delayed data signal, recover the data transmitted to the receiver as a function of the interpolated channel impulse response and the delayed data signal, thereby substantially compensating for any fading and interference in the received signal.

The separating means preferably comprise timing means that extract a portion of each frame for the pilot symbol signal, as a function of a predefined time interval during which the plurality of pilot symbols in each frame are temporally present in the received signal, and then extract a temporal remainder of each frame of the received signal for the data signal. Further, the separating means, the delay means, the pilot signal processing means, the interpolation filter means, and the decoder means preferably comprise a digital signal processor.

The decoder means select a data vector for each data symbol from a set of possible values of data vectors, [S], by determining a minimum value for an expression, $D([S])$, after evaluating the expression for each data vector in the set. The expression is defined as:

$$D([S]) = \sum_{i=L+1}^{M-L-1} |r(i) - [S(i)][W(i)]|^2$$

where $r(i)$ is the $i_{th}$ received data symbol, $[W(i)]$ is the interpolated channel impulse response for the $i_{th}$ received data symbol, M is a total number of data symbols and pilot symbols in each frame, and L is a duration for the channel impulse response of the received signals. Note that throughout this specification and in the claims, the notation "[X]" is used to represent X as a vector or a matrix.

In the case where fading is due to an interference between at least two signals traveling over different propagation paths to the receiver, the interpolation filter means comprise matrix operator means for determining the interpolated channel impulse response as a function of a vector product of a vector representing the predefined channel characteristics and a vector of channel estimates derived from the received pilot symbols. The decoder means preferably comprise a Viterbi decoder and preferably implement a reduced complexity decoder algorithm.

Also in the preferred embodiment, the interpolation filter means use predefined channel characteristics, including: a Doppler fading frequency, relative signal strengths of interfering signals at the receiver, propagation delay differences between the interfering signals, frequency offsets between the interfering signals, and a signal-to-noise ratio of the received signals. These predefined channel characteristics are selected based on a worst case scenario for fading and interference between the received signals.

Another aspect of the present invention is a method for compensating a receiver for fading of signals propagating from at least one transmitter to the receiver as frames of data. This method comprises steps that are generally consistent with the functions of the elements comprising the circuit described above.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
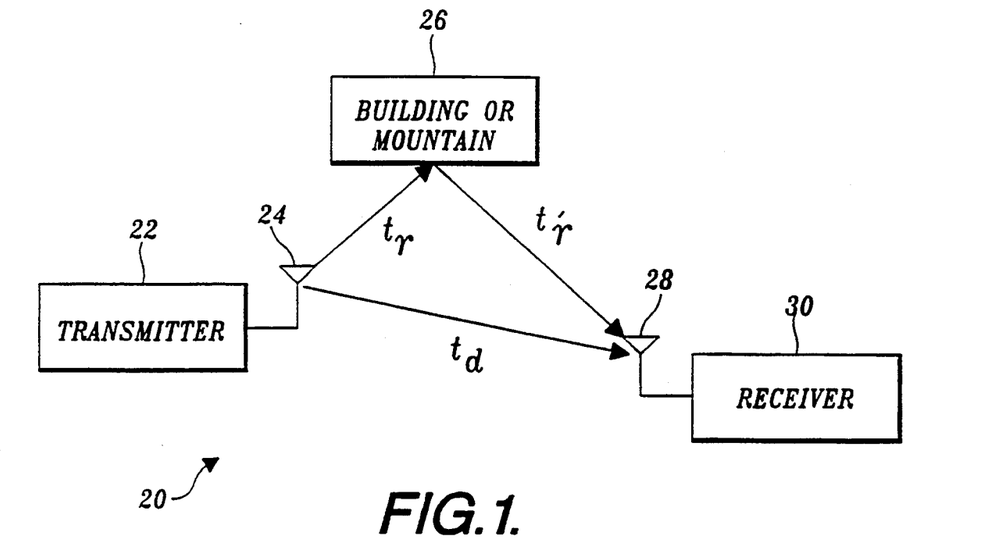
FIG. 1 is a schematic diagram of a radio system in which a receiver receives a direct and a reflected signal, causing multi-path interference and fading.

As described in the Background of the Invention above, a radio receiver is subject to several types of fading and interference. Flat fading occurs when a direct signal fades in and out at the receiver. Two other types of fading result from interference of a plurality of signals, including multi-path and simulcast interference, as shown by block diagrams 20 and 32 in FIGS. 1 and 2, respectively. In schematic block diagram 20, a transmitter 22 transmits an RF signal from an antenna 24, and the signal propagates along a path $t_d$ directly to an antenna 28, which is coupled to a receiver 30. In addition, the signal from transmitter 22 also propagates along a path $t_r$ and is reflected from a man-made object such as a building, or a natural object such as a mountain 26. The reflected signal then travels along a path $t'_r$ toward antenna 28 at receiver 30. The signal travelling along path $t'_r$ and the direct signal travelling along path $t_d$ can interfere, depending upon the phase relationship between the signals at antenna 28. Due to the different path lengths followed by the reflected and direct radio signals, a phase shift and gain change can occur between the two signals. If these reflected and direct signals are 180° out of phase, maximum fading occurs in the signal demodulated by receiver 30.

Figure 2:
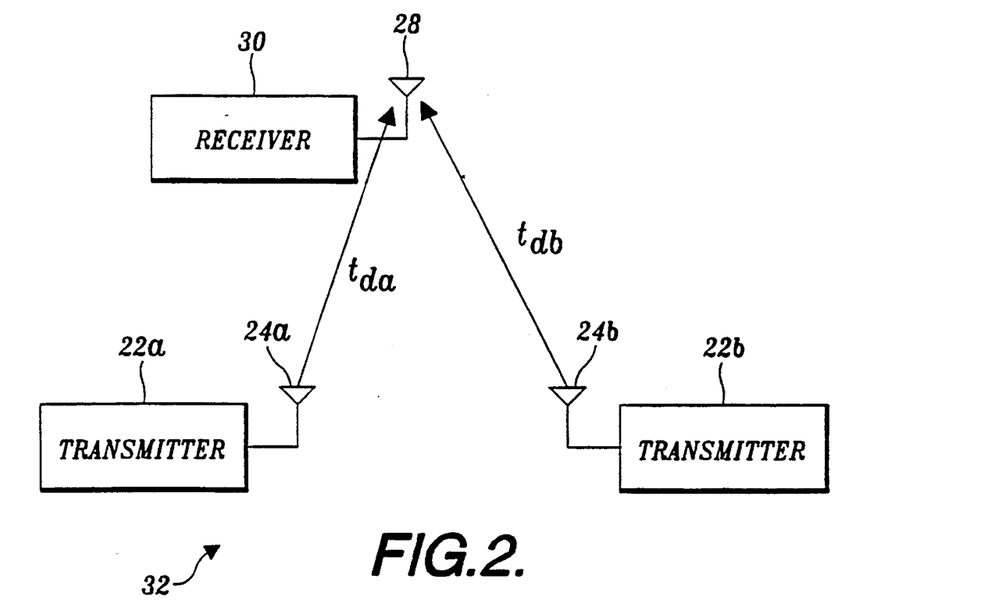
FIG. 2 is a schematic diagram of a simplified simulcast radio system in which a receiver receives simulcast transmissions from different transmitters, and experiences simulcast interference and fading caused by summing signals that have propagated over different length paths and which may have slightly different frequencies.

Similarly, as shown in schematic block diagram 32 in FIG. 2, a first simulcast transmitter 22a and a second simulcast transmitter 22b, which are provided with the same input signal, transmit corresponding linearly modulated RF signals along paths $t_{da}$ and $t_{db}$, respectively, to antenna 28, at receiver 30. The distance traveled by each of these nominally identical RF signals and any slight differences in frequencies of the two signals can cause phase differences at antenna 28 that contribute to fading of the signal demodulated by receiver 30, much like the interference and fading of signals in the multi-path example shown in FIG. 1. Furthermore, flat fading and multi-path interference may combine with simulcast interference, although not specifically shown, to further exacerbate the fading problem at receiver 30.

Figure 4:
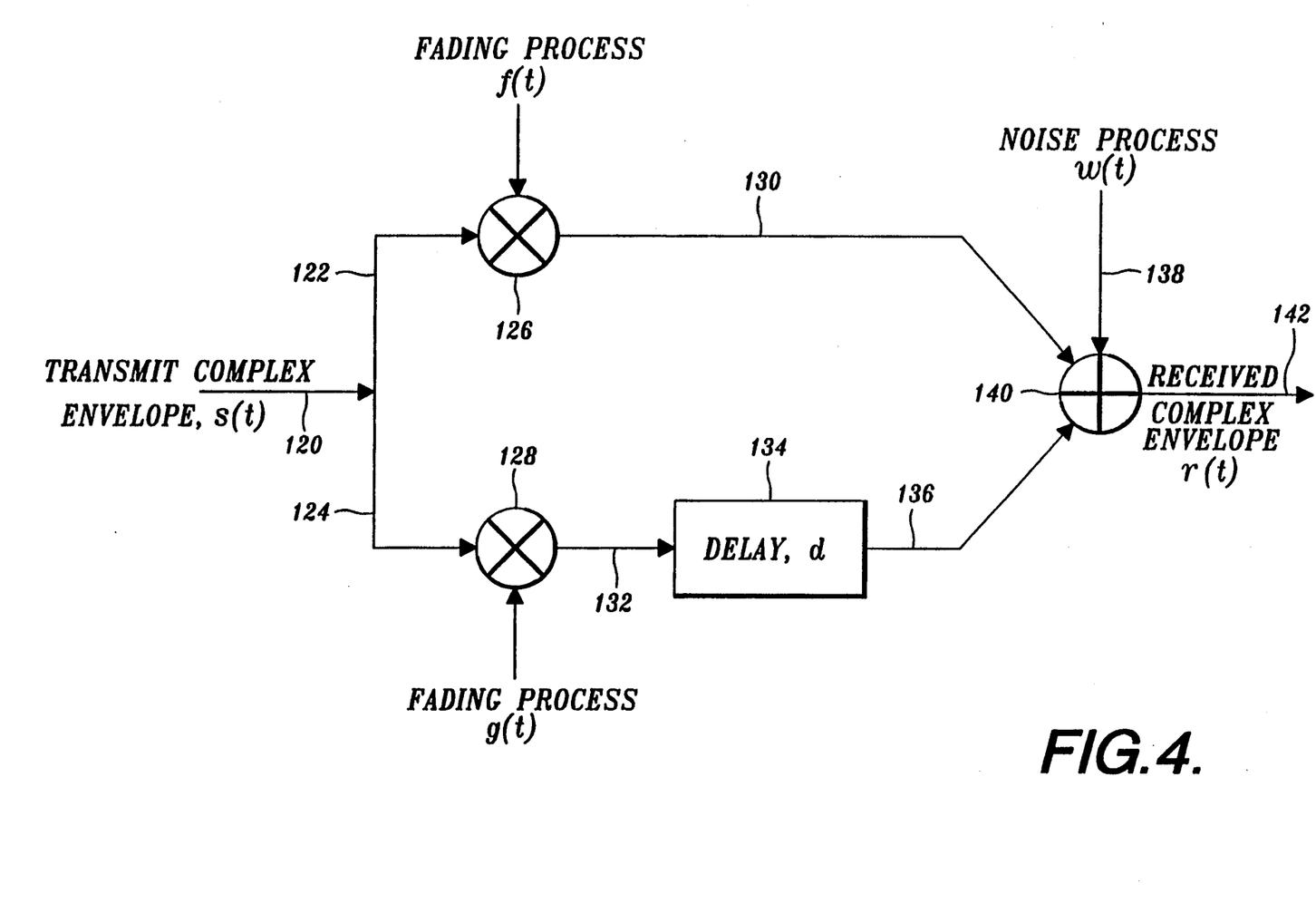
FIG. 4 is a functional diagram illustrating interference and fading in transmitted radio signals.

The preferred embodiment of the present invention is disclosed in an application wherein it is used to recover simulcast paging data at a receiver subject to the three types of fading discussed above. The method is particularly applicable to linear modulation, such as in a 16-ary quadrature amplitude modulated (16QAM) system. In describing the apparatus and the method implemented in the present invention, a two-ray model with independent Rayleigh fading in each ray is adopted, since this channel model is specified by the Telecommunications Industry Association (TIA) for evaluating the performance of the North American Digital Cellular System. Based upon this channel model, if s(t) is a transmitted complex envelope, a corresponding received base band signal r(t) is defined by the following expression:

$$r(t) = f(t)s(t) + g(t)s(t-d) + w(t) \quad (1)$$

where f(t), g(t), and w(t) are all independent complex Gaussian processes and d is the relative delay between two propagation paths. Specifically, f(t) and g(t) represent fading and w(t) represents a channel additive white Gaussian noise (AWGN), as shown in FIG. 4. In this FIGURE, the complex envelope, s(t) represented by line 120 is transmitted along separate paths 122 and 124, each of which are subject to fading processes f(t) and g(t) at multiplier blocks 126 and 128, respectively. The signal subject to fading, which is transmitted along a path 130, is added to other signals at the receiver antenna (as represented by the summation of signals in an adder 140), including the signal traversing a path 132 that is subject to delay d, as represented in a block 134. The resulting delayed signal traverses a path 136 and is summed in adder 140 with both the signal traversing path 130 and the AWGN, represented by w(t), which is represented as an input signal conveyed on a line 138. Adder 140 combines theses signals, providing a received complex envelope r(t) to receiver 30 for demodulation, as indicated by a line 142. The present invention provides a circuit and a method for processing the received signal r(t) to recover the data originally transmitted, which would otherwise be subject to a substantial BER and loss of transmitted information, due to the fading and/or interference between the received signals.

Figure 3:
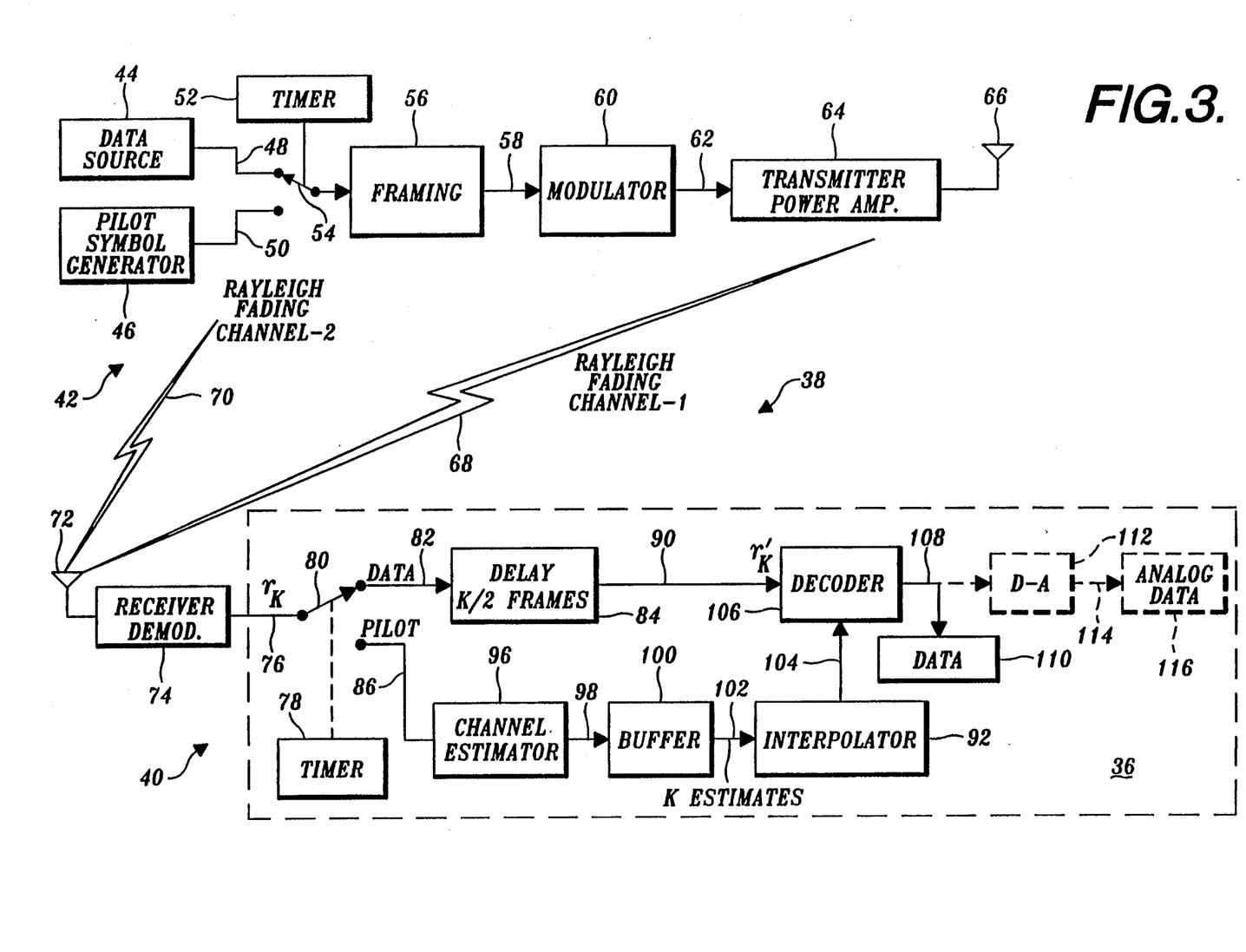
FIG. 3 is a schematic block diagram of a radio transmitter and receiver in a radio system that incorporates the present invention to compensate interference and fading between radio signals received at a receiver.

Turning now to FIG. 3, a radio system that is compensated for fading and interference in accordance with the present invention is generally illustrated at reference numeral 38. Radio system 38 includes a receiver 40 and one or more transmitters 42 (only one transmitter 42 being shown in FIG. 3). Transmitter 42 comprises a data source 44, which generates a plurality of data symbols that are to be transmitted to receiver 40. In addition, a pilot symbol generator 46 produces a plurality of pilot symbols that are grouped together in a block that is transmitted preceding the plurality of data symbols generated by data source 44. The block of pilot symbols followed by the plurality of data symbols comprise a flame of the transmitted signal.

Figure 6:
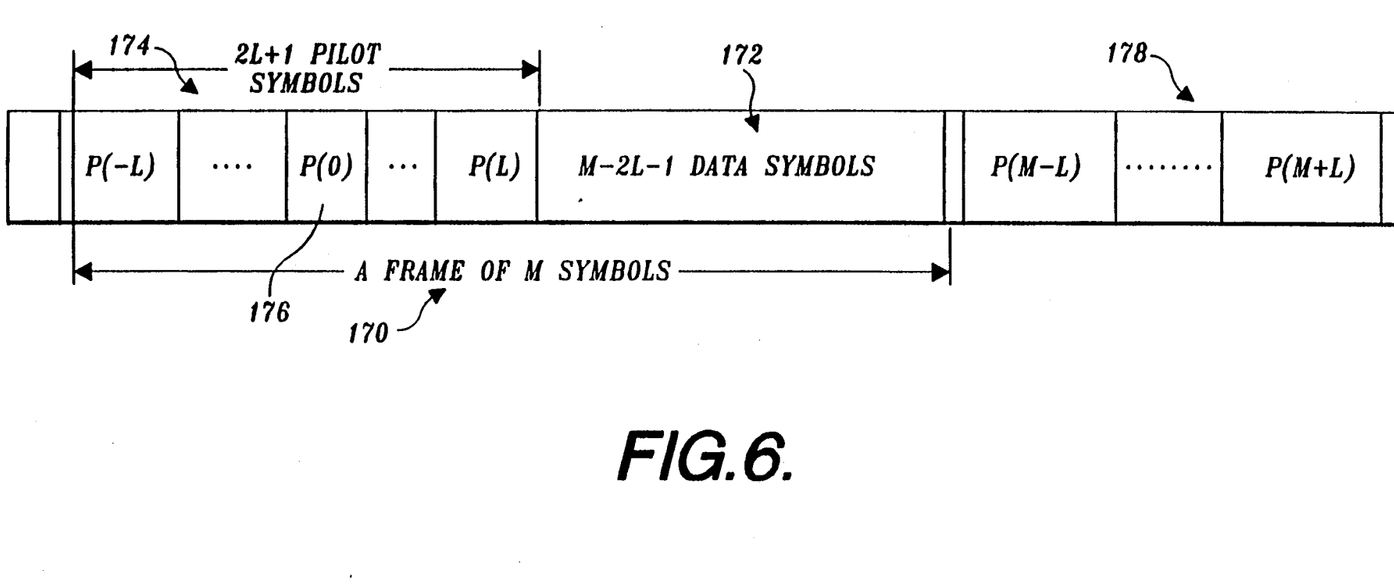
FIG. 6 is a diagram showing the relationship between the pilot symbols and data symbols in each frame of a received signal.

FIG. 6 illustrates an exemplary frame 170 of M (total) symbols, including (2L+1) pilot symbols 174, ranging from P(-L) through P(L), and (M-(2L-1)) data symbols 172. Each successive frame 178 (only a portion of the next successive frame is shown in FIG. 6) similarly includes a block of (2L+1) pilot symbols 174 and a plurality of (M-2L-1) data symbols 172.

The baud rate of data source 44 applies equally to data source 44 and pilot symbol generator 46, so that the overall baud rate at which successive frames of M symbols are transmitted is substantially constant. Data source 44 is coupled through lines 48 to a logic switch 54 that is controlled by a timer (or counter) 52. As a function of the total number of symbols M in each frame, and the relative number of pilot symbols 174 and data symbols 172 in each flame, timer 52 changes the condition of logic switch 54, selecting between data source 44 and pilot symbol generator 46 to determine the type of symbol that is transmitted during portions of successive frames. The selected symbols are conveyed from logic switch 54 to a framing block 56 that compiles the frame of M symbols to be transmitted. Each successive flame 178 is conveyed sequentially on a line 58 to a modulator 60 in transmitter 42. Modulator 60 modulates a carrier signal with the data and pilot symbols, and the resulting modulated signal is conveyed by a line 62 to a transmitter power amplifier 64, which is coupled to a transmit antenna 66.

The modulated frames comprising pilot symbols and data symbols are radiated from transmit antenna 66. A Rayleigh fading channel 1, identified graphically by a "lightning bolt 68" in FIG. 3, represents the effects of fading experienced by the signal finally received at a receive antenna 72. Similarly, a Simulcast Rayleigh fading channel 2 (identified by "lightning bolt" 70) represents the fading experienced by a signal transmitted from another transmitter and/or the signal from transmit antenna 66 after it is reflected from a man-made or natural object. Interference between these two Rayleigh fading channels can cause substantial fading, making difficult the recovery of the data symbols transmitted in a conventional receiver. However, receiver 40 includes circuitry that makes use of the pilot symbols produced by pilot symbol generator 46 and transmitter 42, to recover the data symbols affected by fading and interference, thereby substantially compensating for such undesired effects.

Receive antenna 72 is coupled to a receiver demodulator 74, which demodulates the signal r(t), producing a demodulated signal $r_K$. The demodulated signal $r_K$ is input to a circuit 36 over a line 76. In the preferred embodiment, circuit 36 comprises a digital signal processor. The demodulated signal on line 76 is conveyed to a logic switch 80, which is controlled by a timer (or counter) 78 that is synchronized with timer 52 in each transmitter 42 (at least in terms of determining the duration of each frame and the portion of each frame that respectively comprises pilot symbols and data symbols). Timer 78 causes logic switch 80 to divert the pilot symbol portion of the received demodulated signal to a line 86 that is coupled to a channel estimator 96, and to divert the data symbol portion of each frame to a line 82, which is coupled to a delay block 84. Thus, logic switch 80 separates the pilot symbols from the data symbols in each frame received.

In the preferred embodiment, delay block 84 delays successive frames of data symbols by K/2 frames of data. This delay enables interpolation of an estimated channel impulse response that is applied to successive data symbols in each frame to compensate for fast fading (fast fading being defined as fading that occurs at a rate in excess of 100 Hz) and to provide more than 80 μs of equalization for simulcast signals, as will be apparent from the following discussion.

While the data symbols in successive frames are being delayed by delay block 84, channel estimator block 96 processes the current pilot symbols to derive a channel impulse response estimate for the current 2L+1 pilot symbols that will be used with the channel impulse response estimate for corresponding 2L+1 pilot symbols in successive and previous frames. The channel impulse response estimates for the current frame are conveyed via a line 98 for temporary storage in a buffer 100. Buffer 100 stores K channel impulse response estimates that are input over a line 102 to an interpolator 92. Interpolated channel impulse response estimates are determined using the K channel impulse response estimates, including the K/2 channel impulse response estimates from the previous frames, and the K/2 Channel impulse response estimates from the current and successive frames. The delayed data symbols from delay block 84 are then processed with the interpolated channel impulse response estimates to recover the data symbols subject to fading.

Interpolator 92 carries out a relatively straightforward interpolation operation to achieve greater accuracy in recovering the data symbols. Under optimum conditions, a received signal might be subject to relatively slow fading. Slow fading conditions mean that a channel impulse response estimate applied to each of the data symbols in a frame would be substantially constant over the duration of the frame. However, fading rates up to and exceeding 100 Hz are quite common, causing a substantially different channel impulse response estimate to apply to the data symbols early in a frame, as compared to that which should be applied to the data symbols later in the frame. To accommodate the rapidly changing channel estimate and minimize the BER of the data recovered from the received signal during fast fading, it is important that an interpolation of the channel impulse response estimate be applied to the data symbols over the duration of each frame. In the simplest case, a channel impulse response estimate for the pilot symbols in the frames immediately before and after the data symbols being processed could be applied to interpolate a channel impulse response estimate for each of the data symbols in the frame. However, a substantially lower BER can be obtained by using the channel impulse response estimates from two or three frames before and alter the frame of data symbols being processed.

Interpolator 92 in the present invention, unlike the prior art system discussed above, uses predefined channel characteristics to develop an appropriate interpolated channel impulse response estimate to apply to each of the data symbols in a frame being processed. These predefined channel characteristics include the Doppler fading frequency for the channel, the relative signal strengths of interfering signals at receiver 40, propagation delay differences between received signals that might interfere with each other, frequency offsets between the interfering signals (which is more likely to occur in simulcast paging systems, since the frequency of each simulcast transmitter may be slightly offset from the frequency of other simulcast transmitters in the system), and the signal-to-noise ratio of the received signals. Ideally, it would be desirable to determine or measure each of these channel characteristics on a real time basis so that a current value for the specific characteristic in question is used by interpolator 92. With current technology, such real time determination of the channel characteristics is not economically feasible. However, if cost is of no concern, the channel characteristics can be estimated in real time using a faster, more expensive processor than is contemplated in the present preferred embodiment. Accordingly, the current preferred embodiment instead uses predefined worst case values for each of these channel characteristics that are applied, to determine the interpolated channel impulse response estimates used with each data symbol in a frame being processed. Further details of the interpolation process are disclosed below.

Interpolator 92 is coupled through a line 104 to a decoder 106. Decoder 106 applies the interpolated values determined by interpolator 92 to the delayed data values of the frame being processed, thereby recovering the data originally transmitted by compensating for fading or interference. If the data originally transmitted is analog data, instead of coupling the output of decoder 106 to a data block 110, a digital-to-analog converter (DAC)112 is instead coupled to receive the decoded data. DAC 112 converts the data to an analog signal, as indicated in a block 116, which is output via a line 114.

Theory and Operation of the Preferred Embodiment

The fading process is very much a function of the channel characteristics. The present invention therefore takes the channel characteristics into consideration when determining interpolated channel impulse response estimates to apply to the data symbols, as explained above. The following text explains how these channel characteristics enter into this process. Referring back to FIG. 4, the auto-correlation function of the two fading processes f(t) and g(t) is represented by the following two equations:

$$R\_ff\_(t') = P\_ff\ J(2\pi F_d t') \exp(j2\pi F1 t') \quad (2)$$

$$R\_gg\_(t') = P\_gg\ J(2\pi F_d t') \exp(j2\pi F2 t') \quad (3)$$

where P_ff and P_gg are variances (corresponding to the power) of the two random fading processes, $F_d$ is the maximum or worst case Doppler frequency, $J(2\pi F_d t')$ is the zero-order Bessel function, t' is the variable in the auto-correlation functions, and F1 and F2 are frequency offsets of the two received signals (relative to the receiver).

The normalized root-mean-squared delay spread associated with the two-ray fading model is given by:

$$S = \frac{b\sqrt{a}}{1 + a} \quad (4)$$

where a is the power split ratio and is defined by the following equation:

$$a = \frac{P\_ff}{P\_gg} \quad (5)$$

The value b in Equation (4) is the normalized relative propagation delay, defined by:

$$b = d/T \quad (6)$$

where T is the symbol interval (i.e., 1 divided by the baud rate).

According to the TIA Specification For A Digital Cellular System, a modulation scheme should be capable of handling a root-mean-squared delay spread of at least 20 microseconds. Assuming that a baud rate for such a system is approximately 25 kilobaud, the spread factor S defined by Equation (4) should equal 0.5. If there is an equal power split between fading channels (worst case condition), then the modulation scheme should be capable of handling a propagation delay difference of up to two symbol intervals, 2T (corresponding to the requirement that arises in simulcast paging systems, wherein a delay of 100 μs is possible).

In the preferred embodiment, the received signal r(t) is sampled by a receiver 40 at the same baud rate that the signal was transmitted. However, it should be noted that other sampling rates (e.g., integer multiples of the transmit baud rate) could alternatively be used. Since frequency selective fading occurs in each channel, the received samples r(k) can be written in the form:

$$r(k) = [S(k)][H(k)] + n(k) \quad (7)$$

where:

$$[S(k)] = [s(k), s(k-1), \ldots, s(k-L)] \quad (8)$$

is the $k_{th}$ data vector, s(k) is the $k_{th}$ data symbol, $$[H(k)] = [h(k,0), h(k,1), \ldots, h(k,L)] \quad (9)$$

is the $k_{th}$ channel state vector, n(k) is the $k_{th}$ filtered noise term, and L is the memory of the channel.

In Equation (9), the [h(k,.)]' values are a set of correlated, zero mean, complex Gaussian variables, whose correlation function is determined by three parameters, including the auto-correlation functions of the channel fading processes as set forth in Equations (2) and (3), the pulse shape transmitted by transmitter 42, and the sampling instances.

Figure 5:
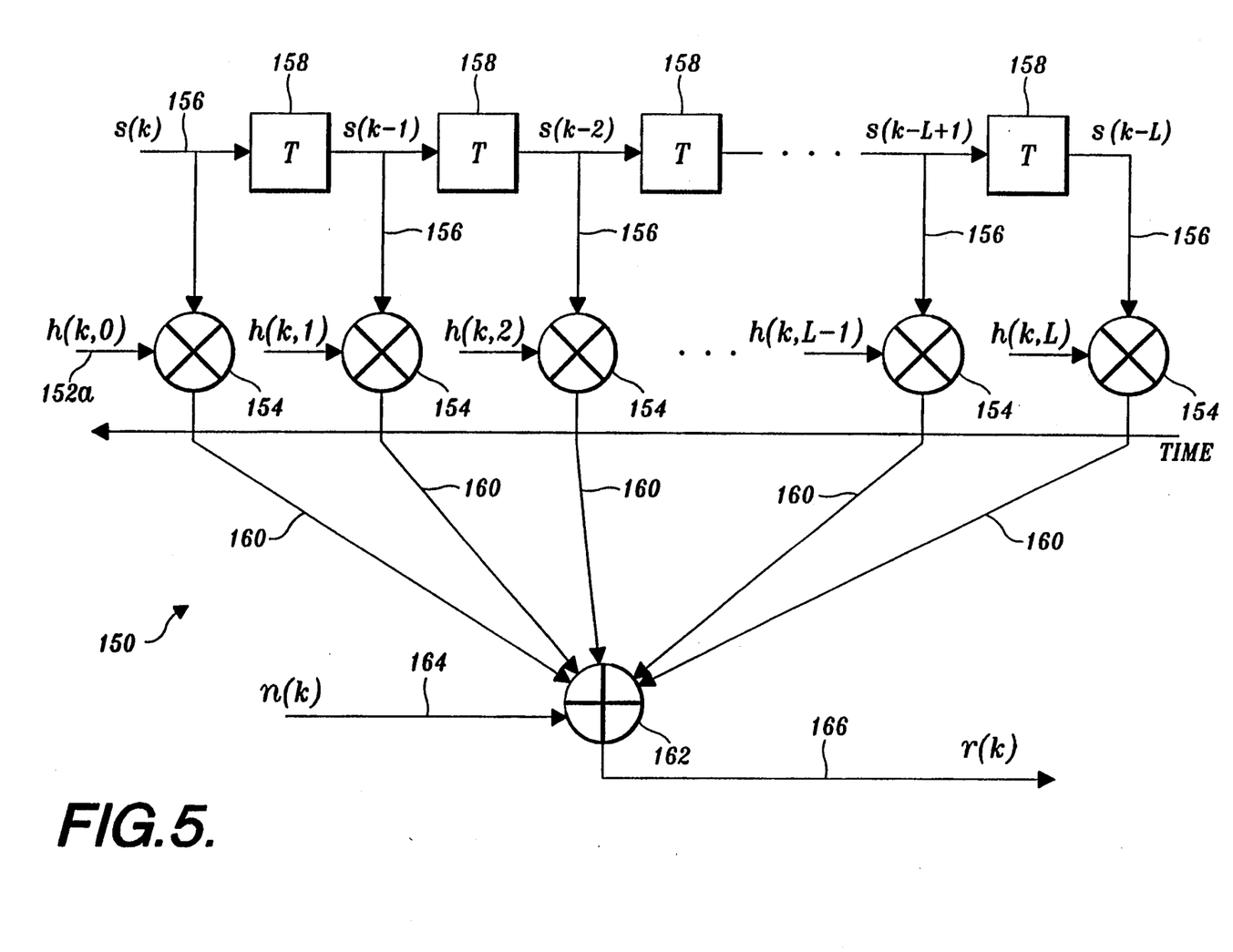
FIG. 5 is a discrete time model diagram of a modulation system, showing a received signal (data vector [S(k)]), sampled at intervals of time T, and a channel state vector [H(k)])

FIG. 5 depicts the fading model mathematically defined by Equation (7). In FIG. 5, a discrete time model of the modulation system and fading process for a series of data symbols s(k) through s(k−L) is identified by lines 156, which occur at spaced-apart sample times T as indicated by blocks 158. Each of the data symbols is multiplied by corresponding channel state vector elements h(k,0) through h(k,L), represented by multipliers 154, yielding values that are summed together in an adder 162, as represented by lines 160, with a noise term represented by a line 164, yielding the received signal r(k) that is conveyed on a line 166.

The purpose for transmitting a predefined set of pilot symbols is to enable a channel state or impulse response estimate to be made for each block of pilot symbols. Since the transmitter transmits a predefined set or block of pilot symbols in each frame, the effect of fading is clearly indicated by the nature of the received pilot symbols, relative to the expected (predefined) pilot symbols.

If we assume that channel fading is sufficiently slow that the channel state vector [H(k)] is substantially constant over successive time intervals (0, LT), and if we ignore the noise term n(k), it should be apparent that an estimate of the channel state vector can be obtained by multiplying a matrix of the received samples over the same time interval by the inverse of the corresponding data vector [S(k)]. However, since the data samples received, which determine the vector [S(k)], are not known for this interval, we must rely upon the predefined pilot symbols that are known. In the preferred embodiment, a total of 2L+1 pilot symbols are transmitted for each frame of M total symbols. For channels with relatively slow fading, the value M can be relatively large. As a relatively crude guideline, M should be less than $1/(2F_d T)$. In the preferred embodiment, it has been empirically determined that a reasonable choice for M is about 35 for a value ($F_d T$) equal to 0.01. However, at this fade rate, the channel response changes significantly during the time interval of a frame, i.e., we are no longer dealing with slow fading. As a result, the data symbols at the beginning of a frame can be subject to a substantially different channel impulse response than those at the end of the frame. Therefore, it is imperative that interpolation of the channel impulse response estimates obtained from K surrounding pilot symbol blocks be used to obtain accurate interpolated channel impulse response estimates to be applied to successive data symbols at different times within each frame, as will be explained below.

While recognizing that the slow fading case does not represent typical real world fading conditions, it is still helpful to initially consider the problem in the slow fading context. For slow fading, it is apparent that the pilot symbol matrix [P] is defined as follows:

$$[P] = \begin{vmatrix} P(0) & P(-1) & \ldots & P(-L) \\ P(1) & P(0) & \ldots & P(-L-1) \\ \ldots & \ldots & \ldots & \ldots \\ P(L) & P(L-1) & \ldots & P(0) \end{vmatrix} \quad (10)$$

over the memory of the channel, L. The inverse of [P] is denoted by:

$$[Q] = [P]^{-1} \quad (11)$$

and thus, the channel impulse response estimate over time intervals (0, L) for slow fading is defined by:

$$[V] = [Q][r] \quad (12)$$

where $[r] = [r(0), r(1), \ldots, r(L)]'$, where r(k) is the $k_{th}$ received sample.

Intuitively, the predefined pilot symbol sequence transmitted during each frame should be chosen in such a way as to minimize channel impulse response estimation errors. For a channel memory L equal to 1 or 3, a "perfect" pilot symbol sequence exists that minimizes the mean-squared error in the channel impulse response estimates. However, if other pilot symbol sequences are chosen that are not perfect, the error can still be minimized by appropriate selection of the pilot symbol sequence.

In TABLE 1, the pilot symbol sequences for two types of linear modulation are shown, for memory channels of length L equal to 1 through 6. The two types of linear modulation for which exemplary pilot symbol sequences are shown in the following table include: π/4 quadrature phase shift keying (QPSK) and 16QAM.

the radio system, this number is too large to use without creating gross inefficiencies. Accordingly, L should realistically be restricted to six or less symbols in applying the present pilot symbol technique. Since the optimum number of pilot symbols is not used, a slight degradation in compensating for fading using this technique results, proportionally reducing the SNR of the radio system.

Since most radio systems, particularly simulcast paging systems, are subject to rapid fade rates approaching and even exceeding 100 Hz, the present technique uses interpolation to determine the interpolated channel impulse response estimate applied to each data symbol in a frame. More importantly, as noted above, the interpolator takes into consideration predefined worst case channel characteristics in carrying out the interpolation, thereby yielding substantially improved interpolated channel impulse response estimates that are applied to each data symbol in the frame being processed, compared to the prior art. These worst case channel characteristics are determined by modeling the channel.

Assuming a discrete multi-path propagation model, the covariance matrix of [H(k)] is defined as:

$$R_{HH}(k,k) = \tfrac{1}{2}\overline{[H(k)][H(k)]'} \quad (13)$$

wherein the bar in Equation (13) denotes a statistical average and [H(k)]' is the conjugate transpose of [H(k)]. The covariance matrix $R_{HH}(k,k)$ is a function of four channel parameters including the maximum Doppler frequency (also referred to as the fade rate), the received signal strength for the different propagation paths (multipath propagation), the propagation delay differences for the various paths, and in the case of simulcast signals, the frequency offsets between the signals transmitted from different transmitters 42. In addition, the function defined by Equation (13) also depends on the pulse shape used in the radio system. The channel state vectors at different time instances are correlated; for example, the correlation between [H(k)] and [H(m)] is obtained by substituting the conjugate

TABLE 1

| Memory of Channel, L | QPSK | 16QAM |
| --- | --- | --- |
| 1 | (−1, 1, 1)* | (−3, 3, 3)* |
| 2 | (−1, −1, −1, 1, −1) | (−3,−3,−3, 3, −3) |
| 3 | (−1, −1, −1, 1, −1, −1, −1)* | (−3, −3, −3, 3, −3, −3, −3)* |
| 4 | (−1, −1, −1, −1, −1, −1, −1, −1, −1) | (−3, −3, −3, −3, 3, −3, −3, −3, −3) |
| 5 | (−1, −1, −1, −1, 1, −1, 1, 1, −1, 1, 1) | (−3, −3, −3, −3, 3, −3, 3, 3, −3, 3, 3) |
| 6 | (1, −1, −1, −1, −1, 1, −1, 1, 1, −1, −1, −1, −1) | (3, −3, −3, −3, −3, 3, −3, 3, 3, −3, −3, −3, −3) |

In TABLE 1 above, the best pilot symbol sequences are listed based upon the assumption that all pilot symbols within the same block have the same phase angle. To avoid spectral spikes, the phase angles of the pilot symbol should be varied in a pseudo-random fashion from frame to frame. The perfect sequences (with minimum error) are indicated by an asterisk in TABLE 1.

In determining the sequence of pilot symbols shown in TABLE 1, channel memories longer than six were not considered, because of the limitations on throughput in receiver 40. If we consider the case where the Doppler frequency is 0.5 percent of the signaling rate, the largest frame size is approximately 100 symbols (M). When L equals 6, the number of pilot symbols required in each frame is equal to 13, resulting in a maximum throughput of about 87% of capacity. Although ideally the memory L of the channel should be at least as large as the duration of the truncated Nyquist pulse used in transpose of [H(m)] for that of [H(k)] in Equation (13).

From each frame of received pilot signals, an estimate of the channel state vector affecting the block of pilot symbols in that frame is derived. The channel state vector at any given data symbol in a frame is obtained by interpolating the K (or 2N) channel impulse response estimates, which are derived from the received pilot symbol blocks from frames surrounding the frame being processed. For a given set of channel parameters and at a given data symbol position within a frame, there exists an optimal interpolated channel impulse response estimate, which is determined as described below.

Given the conditions stated above, wherein there are M symbols per frame of which 2L+1 are pilot symbols, and assuming that the first pilot symbol starts at a time −L, a channel impulse response estimate [V(k)] derived from the $k_{th}$ pilot symbol block is defined by the following equation:

$$[V(k)] = [E(k)] + \sum_{i=0}^{L} [M(i)][H((k - N)M + i)] \quad (14)$$

where the matrix [M(i)], i=0, 1, ... L is the product of [Q] in Equation (11) and a matrix obtained by replacing every row of [P], except the $i_{th}$ row, by zeroes. Further, the matrix [E(k)] is a noise component of the estimate. The correlation between two channel impulse response estimates [V(k)] and [V(m)] is defined by:

$$R_{vv}(k,m) = [R(ee)]\delta(k - m) + \quad (15)$$

$$\sum_{i=0}^{L}\sum_{j=0}^{L} [M(i)]R_{HH}((k - N) + i, (m - N)M + j)[M(j)]'$$

where $\delta(k-m)$ is unity when k=m, [R(ee)] is the covariance matrix for the noise vector [E], and $R_{HH}$ is the correlation between two channel state vectors.

If we define [U] as equal to [H(n)], where [H(n)] is the channel state vector at time n, the correlation between [U] and [V(k)] is defined by:

$$(16)$$

$$R_{vu}(k,n) = \tfrac{1}{2}\overline{[V(k)][H(n)]'} = \sum_{i=0}^{L} [M(i)]R_{HH}((k - N) + i, n)$$

and the correlation between [U] and the chapel state vector $$[V] = \begin{bmatrix} V(1) \\ \ldots \\ V(K) \end{bmatrix}$$

is given by:

$$(17)$$

$$[R(vu)] = \tfrac{1}{2}\overline{[V][U]'} = \begin{vmatrix} R_{vu}(1,n) \\ R_{vu}(2,n) \\ \ldots \\ E_{vu}(K,n) \end{vmatrix}$$

A covariance matrix for [V] is defined by:

$$(18)$$

$$[R(vv)] = \tfrac{1}{2}\overline{[V][V]'} = \begin{vmatrix} R_{vv}(1,1) & R_{vv}(1,2) & \ldots & R_{vv}(1,K) \\ R_{vv}(2,1) & R_{vv}(2,2) & \ldots & R_{vv}(2,K) \\ \ldots & \ldots & \ldots & \ldots \\ R_{vv}(K,1) & R_{vv}(K,2) & \ldots & R_{vv}(K,K) \end{vmatrix}$$

The correlation matrix [R(vu)] and the covariance matrix [R(vv)] uniquely determine an optimal interpolator [F(opt)] that defines the interpolated channel impulse response estimates, as indicated by the following equation:

$$[F(opt)] = [R(uv)][R(vv)]^{-1} \quad (19)$$

In Equation 19, [R(uv)] is the conjugate transpose of [R(vu)], and $[R(vv)]^{-1}$ is the inverse of [R(w)]. The size of this optimal interpolator is L+1 rows and K(L+1) columns. In addition, each row of the optimal interpolator matrix is an interpolated value for a respective component in the channel state vector. Furthermore, the optimal interpolator depends specifically on the data symbol position n, since [R(uv)] is a function of n.

Channel impulse responses for the data potion of a frame are obtained from matrix multiplication of the form:

$$[W] = [V(opt)][V] \quad (20)$$

where [F(opt)] is the optimal interpolator from Equation (19) and [V] is the channel state vector. There is one such operation for each data symbol, and if:

1. [W(i)] is the channel estimate for the i-th data symbol;
2. r(i) is the received signal for the i-the data symbol, and
3. [S(i)]=[s(i), ... s(i−L)] is the data vector defined by Equation 8, then, the optimal decoder will select the data vector [S]=[s(L+1), ... s(M−L−1)] that minimizes the expression:

$$D([S]) = \sum_{i=L+1}^{M-L-1} |r(i) - [S(i)][W(i)]|^2 \quad (21)$$

where r(i) is the $i_{th}$ received data symbol, [W(i)] is the interpolated channel impulse response for the $i_{th}$ received data symbol, M is a total number of data symbols and pilot symbols in each frame, and L is a duration for the channel impulse response of the received signals. The optimal decoder that carries out this function is preferably a Viterbi decoder, but a reduced complexity type, such as one that implements the M-algorithm (as discussed below) is used in the preferred embodiment to reduce processing overhead.

Based upon the above theoretical development, it should be apparent that the correlation between the channel state vectors at two different times $R_{HH}(k,m)$ depends upon the Doppler frequency or fade rate, the power (or SNR) of each of the two fading processes, the normalized propagation delay difference between signals received, and any frequency offsets between two propagation paths (in a simulcast paging application). Since the optimal interpolator [F(opt)] in Equation 19 depends on the correlation $R_{HH}(k,m)$, it should be evident that the optimal interpolator used in the present invention also depends upon these predefined channel parameters.

In summary, the optimal interpolator used in the present application for interpolating the channel impulse response to apply to data symbols in a frame being processed, is determined by taking into consideration the channel characteristics, and its determination involves six steps: (1) the memory of the discrete time channel L is determined (a value of 1 through 6), based upon the transmit/receive pulse shapes and the expected maximum delay difference in a multipath channel (limited to considerations of processing efficiency and time); (2) based upon the selected value for L, an optimal pilot symbol sequence is determined, for example using one of the sequences shown in Table 1; (3) using the selected pilot symbol sequence, matrices [P], [Q], [R(ee)], and [M(i)] are determined as explained above; (4) based upon the value of L, the pulse shape used in the transmissions, expected (or worst case) number of paths for a signal propagating in the radio channel, and the expected (or worst case) propagation delay difference, explicit expressions for each component of the channel state vector are determined; (5) based on the expected (or worst case) Doppler frequency, the expected (or worst case) signal strength distribution among the different rays arriving at the receiver, and the results obtained from the preceding step, the correlation between any two channel state vectors is determined as indicated above in Equation 13; and (6) the optimal interpolator for a given data symbol is determined using the correlation matrices computed in the preceding step and the matrices computed in the third step.

To define the channel characteristics used in the preceding process of determining the optimal interpolator, the channel can be modeled for predefined conditions, or worst case conditions can be determined from the model based upon known signal propagation factors. Once the constraints or predefined channel parameters used to determine the optimal interpolator are defined, these constraints are stored in memory available to DSP 36 for use by interpolator block 92 to determine the appropriate interpolated channel impulse response estimate to apply to each successive data symbol, as a function of those channel impulse response estimates and as a function of the preceding and succeeding blocks of pilot symbols.

Besides the optimal interpolator defined in Equation 20, polynomial interpolators can also be used for channel estimation. The order of these polynomial interpolators is simply the number of pilot symbol blocks K used in the initial channel estimation process. Since K depends on the model for the fading spectrum and on the maximum Doppler frequency, $f_d$, the polynomial interpolators are also functions of the channel characteristics. When these polynomial interpolators are used, the different components of the channel impulse response are interpolated independently.

Decoder 106 selects a data vector for each data symbol from a set of possible values of data vectors, [S], by determining a minimum value for the expression, D([S]), which is defined above in Equation (21). To find the minimum of the expression for D([S]), the conventional Viterbi decoder algorithm would normally be used. The complexity of the Viterbi decoder can be very high. For example, in the above expression, if S(i) is 4-ary (i.e., for QPSK modulation) and if the channel memory is 6 symbols (L=6), the number of states in the Viterbi decoder is 4,096 ($4^6$) and 16,384 ($4*4^6$) squared distance calculations per data symbol are required for the Viterbi decoder. At a data rate of 20,000 baud, 327 million squared distance calculations per second are required. Clearly, calculating that many parameters in real time is not feasible. However, several algorithms have been developed to reduce the complexity of the Viterbi algorithm. The M-algorithm is one such reduced complexity algorithm; this algorithm only retains the M states of the set [S] for which the expression is minimized. If 128 states are retained, a maximum of 512 (4*128) squared distance calculations per data symbol are required for QPSK. A 20,000 baud data rate requires a maximum of 10.24 million squared distance calculations per second—a more realistically obtainable processing load for currently available processors. Reducing the number of states retained further reduces the number of calculations required and thus, the processing requirements of the algorithm can be tailored to the processor's capabilities.

The Viterbi algorithm is theoretically optimal in that it always chooses the set [S] with the minimum squared error. In contrast, the M-algorithm is sub-optimal in that it may not always choose the set [S] with the minimum squared error; however, the performance of the M-algorithm approaches that of the Viterbi algorithm with significantly less processing power. For these reasons, the preferred embodiment implements the Viterbi decoder using the reduced complexity M-algorithm.

As an alternative, decoder 106 can comprise an equalizer, followed by a decision device. In one preferred alternative form of the invention, a decision feedback equalizer is used. It is also contemplated that a reference symbol equalizer could be used in place of or in combination with the decision feedback equalizer, to implement the decoding function.

Figure 9:
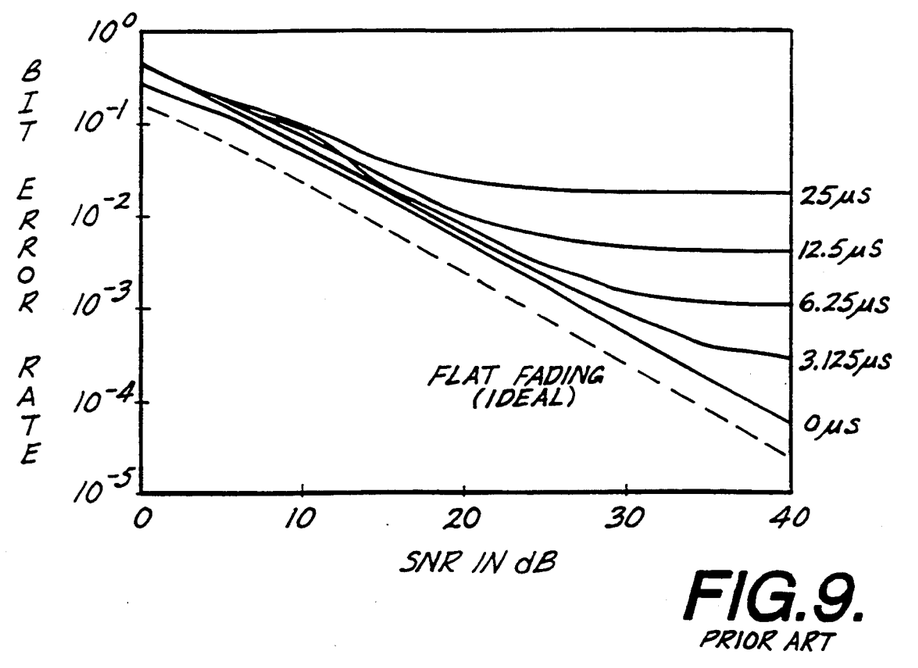
FIG. 9 is a graph of the BER versus signal to noise ratio (SNR) at different root mean squared delays, in a prior art system that also compensates for fading and interference using pilot symbols.
Figure 10:
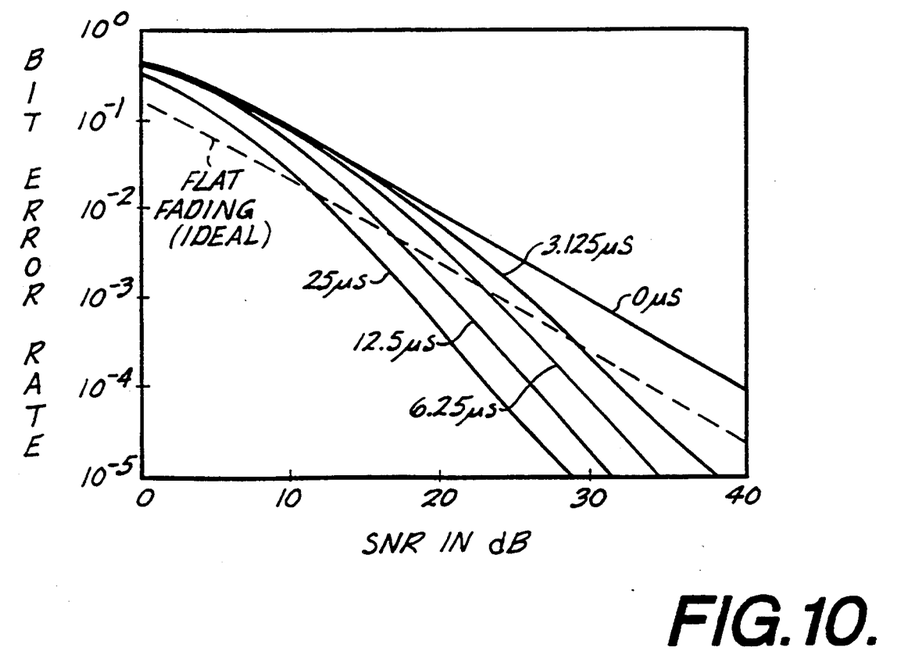
FIG. 10 is a graph of the BER versus SNR, at different root mean squared delays, for the present invention.

The advantages of the present invention as compared to prior art techniques for using pilot symbols to compensate for fading are evident by comparison of FIGS. 9 and 10. In FIG. 9, a prior art system described in the Background Of The Invention is used to compensate for fading and interference. In this prior art system, no provision is made for interpolation of a channel impulse response estimate based on expected or worst case channel characteristics. Consequently, for a root mean squared delay spread between two fading signals of 25 $\mu s$ and an SNR ratio of 30 dB, the expected BER is about $\times 10^{-1}$. In comparison, as indicated in FIG. 10, the present invention provides a BER of about $10^{-5}$. It is also apparent that, at least over the limited range of root mean squared delay spread shown, the BER decreases with increasing root mean squared delay, in contrast to the prior art system, wherein the BER increases with increasing root mean squared delay spread.

Processing Logic Implemented at the Transmitter and at the Receiver

Figure 7:
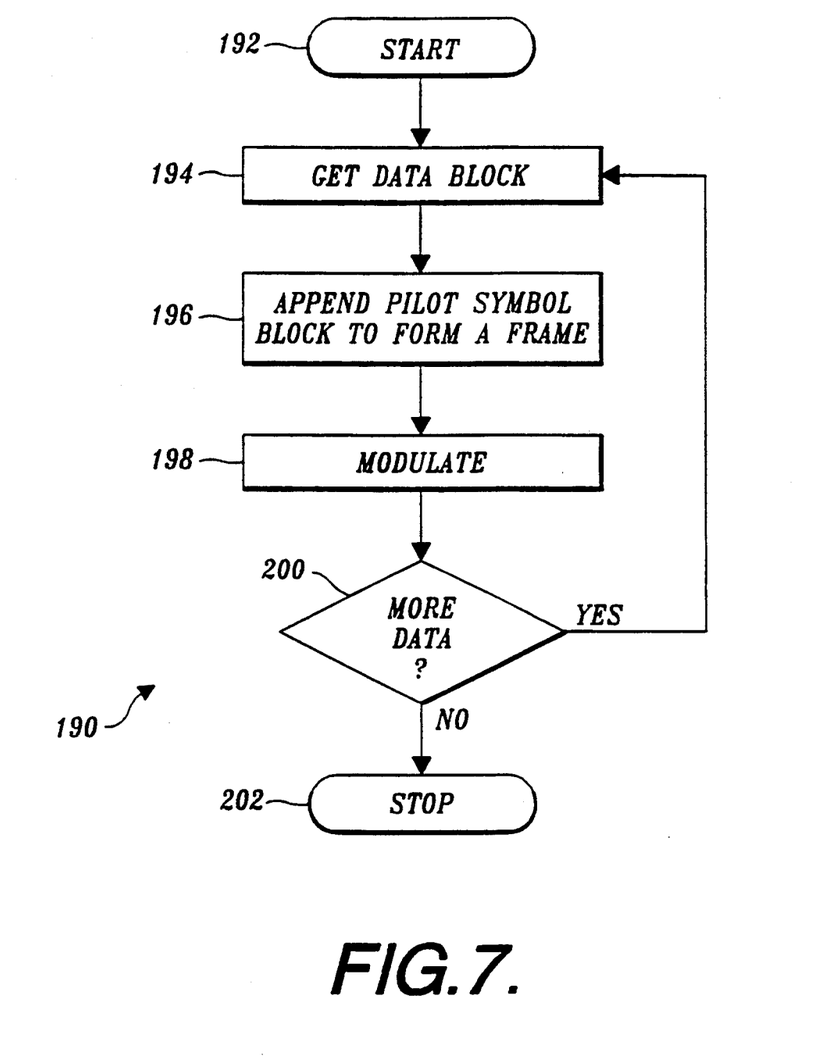
FIG. 7 is a flow chart showing the steps undertaken at the transmitter to include a plurality of pilot symbols with data symbols in each frame that is modulated and transmitted.

The logical steps performed at transmitter 42 to encode the signal transmitted with a plurality of pilot symbols in successive frames are illustrated in a flow chart 190 in FIG. 7. Flow chart 190 begins at a start block 192 and proceeds to a block 194, wherein an additional block of data is obtained from the input signal. In a block 196, a set of pilot symbols are appended to the data symbols to form a frame. The frame is then modulated by transmitter 42 in a block 198. A decision block 200 determines if more data is available, i.e., if the input signal is still present for sampling and modulation, and if so, returns to block 194 for input of the additional data. If not, the logic proceeds to a stop block 202.

Figure 8:
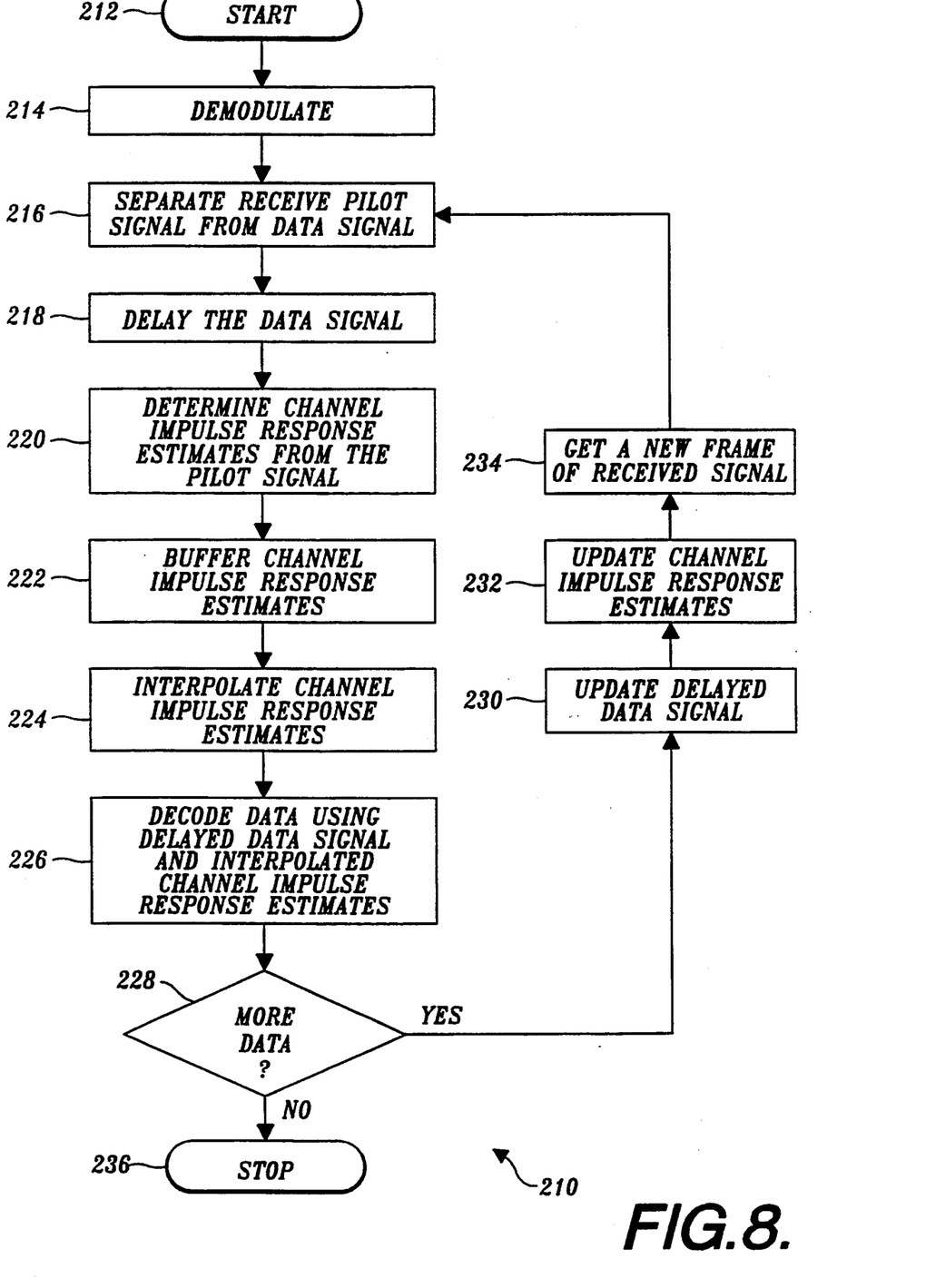
FIG. 8 is flow chart illustrating the logical steps implemented at the receiver to recover data from received signals that are subject to fading and interference.

In FIG. 8, a flow chart 210 illustrates the steps carded out by receiver 40 in processing the received signals, which may be affected by simple fading, and fading due to either multi-path interference and/or simulcast interference. From a start block 212, the logic proceeds to a block 214 wherein the received signal is demodulated. Thereafter, a block 216 provides for separating the received pilot symbols in each frame from the data symbols, producing a corresponding pilot signal and data signal.

In a block 218, the data signal is delayed for K/2 frames. The pilot signal is then processed in a block 220 to determine channel impulse response estimates. A block 222 buffers the channel impulse response estimates, providing temporary storage to enable interpolation of the pilot signal using pilot symbols from frames preceding and following a current frame of data symbols being processed.

A block 224 then interpolates the channel impulse response estimates as described above, so as to determine an appropriate interpolated channel impulse response estimate to apply to each data symbol in the frame being processed. In a block 226, the data are decoded by processing the delayed data signal using the interpolated channel impulse response estimates that should appropriately be applied to each successive data symbol in that frame. A decision block 228 determines whether any more data are available to be processed and if not, proceeds to a block 236 wherein processing is halted. Otherwise, the logic proceeds to a block 230 that updates the delayed data signal with the next frame of data symbols. A block 232 then updates the channel impulse response estimates for that frame, and a block 234 obtains a new frame from the received signal for processing, beginning with block 216.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. Circuitry for compensating a receiver for fading of signals propagating as frames of data from at least one transmitter that includes pilot symbol generation circuitry that provides a predefined plurality of pilot symbols in each frame of data transmitted to the receiver, said circuitry comprising:
   (a) separating means, coupled to the receiver for input of a received signal, for separating the plurality of pilot symbols from a plurality of data symbols in each frame of data, producing a pilot symbol signal comprising said plurality of pilot symbols and a data signal comprising said plurality of data symbols, said pilot signal and said data signal being separate from each other;
   (b) delay means, coupled to receive the data signal, for delaying the data signal from a current frame until after the pilot symbol signal from at least one subsequent frame is received, said delay means thereby producing a delayed data signal;
   (c) pilot signal processing means, coupled to receive the pilot symbol signal, for determining an estimated channel impulse response for the plurality of pilot symbols in each frame of received signals;
   (d) interpolation filter means, coupled to receive the estimated channel impulse response for each frame of data and including storage means for storing an estimated channel impulse response from at least one prior frame, said interpolation filter means interpolating values of the estimated channel impulse response between the current and prior frames to determine, as a function of channel characteristics, an interpolated channel impulse response for each data symbol in a frame; and
   (e) decoder means, coupled to receive the interpolated channel impulse response and the delayed data signal, for recovering the data transmitted to the receiver as a function of the interpolated channel impulse response and the delayed data signal, thereby substantially compensating for fading and interference in the received signals.

2. The circuitry of claim 1, wherein the separating means comprise timing means that extract a portion of each frame for the pilot symbol signal, as a function of a predefined time interval during which the plurality of pilot symbols in each frame are temporally present in the received signal, and then extract a temporal remainder of each frame of the received signal to produce the data signal.

3. The circuitry of claim 1, wherein the separating means, the delay means, the pilot signal processing means, the interpolation filter means, and the decoder means comprise a digital signal processor.

4. The circuitry of claim 1, wherein the fading is due to an interference of at least two signals traveling over different propagation paths to the receiver, and wherein the interpolation filter means comprise matrix operator means for determining the interpolated channel impulse response as a function of a vector product of a vector representing the channel characteristics and a vector of channel impulse response estimates derived from the received pilot symbols.

5. The circuitry of claim 1, wherein the decoder means comprise an equalizer and a decision device.

6. The circuitry of claim 1, wherein said interpolation filter means uses channel characteristics selected from a set including:
   (a) a Doppler fading frequency;
   (b) relative signal strengths of interfering signals at the receiver;
   (c) propagation delay differences between the interfering signals;
   (d) frequency offsets between the interfering signals; and
   (e) a signal-to-noise ratio of the received signals.

7. The circuitry of claim 6, wherein the channel characteristics are selected based on a worst case scenario for fading and interference between the received signals.

8. The circuitry of claim 1, wherein the decoder means select a data vector for each data symbol from a set of possible values of data vectors, $\{S\}$, by determining a minimum value for an expression, $D(\{S\})$, after evaluating the expression for each data vector in the set, the expression being defined as:

$$D(\{S\}) = \sum_{i=L+1}^{M-L-1} |r(i) - \{S(i)\}\{W(i)\}|^2$$

where:
   $r(i)$ is the $i_{th}$ received data symbol;
   $\{W(i)\}$ is the interpolated channel impulse response for the $i_{th}$ data symbol;
   M is a total number of data symbols and pilot symbols in each frame; and
   L is a duration for the channel impulse response of the received signals.

9. The circuitry of claim 8, wherein the decoder means comprise a Viterbi decoder, which optimally selects the set $\{S\}$.

10. The circuitry of claim 8, wherein the decoder means comprise a Viterbi decoder that determines the set $\{S\}$ by implementing a reduced complexity form of a Viterbi algorithm, having a suboptimal performance.

11. A method for compensating a receiver for fading of signals propagating as frames of data from at least one transmitter that provides a predefined plurality of pilot symbols in each frame of data transmitted to the receiver, said method comprising the steps of:
   (a) separating the plurality of pilot symbols from a plurality of data symbols in each frame of data, producing a pilot symbol signal and a data signal that are separate from each other;

(b) delaying the data signal from a current frame until after the pilot symbol signal from at least one subsequent frame is received, thereby producing a delayed data signal;

(c) determining an estimated channel impulse response from the plurality of pilot symbols in each frame of the received signal;

(d) storing the estimated channel impulse response from at least one prior frame;

(e) interpolating values of the estimated channel impulse response between the current and prior frames to determine, as a function of channel characteristics, an interpolated channel impulse response for each data symbol in a frame; and (f) recovering the data transmitted to the receiver as a function of the interpolated channel impulse response and the delayed data signal.

12. The method of claim 11, wherein the step of separating the plurality of pilot symbols from each frame of data comprises the step of extracting a portion of each frame for the pilot symbol signal, as a function of a predefined time interval during which the plurality of pilot symbols in each frame are temporally present in the received signal, and then extracting a temporal remainder of each frame of the received signal for the data signal.

13. The method of claim 11, wherein the fading is due to an interference of at least two signals traveling over different propagation paths to the receiver, and wherein the step of interpolating comprises the step of determining the estimated channel impulse response as a function of a vector product of a vector representing the channel characteristics, and a vector of channel impulse response estimates derived from the received pilot symbols.

14. The method of claim 11, wherein the step of interpolating uses predefined channel characteristics selected from a set that includes:

(a) a Doppler fading frequency;

(b) relative signal strengths of interfering signals at the receiver;

(c) propagation delay differences between the interfering signals;

(d) frequency offsets between the interfering signals; and (e) a signal-to-noise ratio of the received signals.

15. The method of claim 11, wherein values for the channel characteristics are predefined and selected based on a worst case scenario for fading and interference between signals received by the receiver.

16. The method of claim 11, wherein the step of recovering comprises the step of decoding the data transmitted with a bit error rate that over a predefined range, decreases, as a differential delay between interfering signals received by the receiver increases.

17. The method of claim 11, wherein the signals received convey substantially the same data, transmitted substantially simultaneously from different transmitters, said step of interpolating compensating for fading due to interference between said signals.

18. The method of claim 11, wherein the step of interpolating comprises the step of determining, for each data symbol in a frame, a corresponding interpolated channel impulse response, $\{W\}$, defined by:

$$\{W\}=\{F(opt)\}\{V\}$$

where:

$\{F(opt)\}$ is an optimal interpolator matrix determined as a function of the channel characteristics; and $\{V\}$ is a vector comprising estimated channel impulse response values derived from a plurality of pilot symbols in a plurality of frames.

19. The method of claim 11, wherein the step of recovering the data comprises the step of selecting a data vector for each data symbol from a set of possible values of data vectors, $\{S\}$, by determining a minimum value for an expression, $D\{S\}$), after evaluating the expression for each data vector in the set, the expression being defined as:

$$D(\{S\}) = \sum_{i=L+1}^{M-L-1} |r(i) - \{S(i)\}\{W(i)\}|^2$$

where:

$r(i)$ is the $i_{th}$ received data symbol;

$\{W(i)\}$ is the interpolated channel impulse response for the $i_{th}$ data symbol;

M is a total number of pilot symbols and data symbols in each frame; and

L+1 is a duration for the channel impulse response of the received signals.

20. The method of claim 19, wherein $\{W(i)\}$ is equal to a vector product of an optimal interpolator matrix $\{F(opt)\}$ and an estimated channel impulse response vector, $\{V\}$, and $\{F(opt)\}$ is defined by:

$$\{F(opt)\}=\{R(us)\}\{R(vv)\}^{-1}$$

where:

$\{R(uv)\}$ is a correlation matrix;

$\{R(vv)\}$ is a covariance matrix;

v is a vector comprising estimated channel impulse response values derived from a plurality of pilot symbols in a plurality of frames; and u is an actual channel impulse response.

21. The method of claim 20, wherein the optimal interpolator matrix $\{F(opt)\}$ includes L+1 interpolators, each row of said matrix comprising a different interpolator, said step of interpolating comprising the step of multiplying the estimated channel impulse response by each of said L+1 interpolators.

22. The method of claim 20, wherein said plurality of data symbols are grouped together and the same optimal interpolator matrix $\{F(opt)\}$ operates on each data symbol in a group, thereby reducing storage for interpolator coefficients.

* * * * *

UNITED STATES PATENT AND TRADEMARK OFFICE
CERTIFICATE OF CORRECTION

PATENT NO. : 5,414,734
DATED : May 9, 1995
INVENTOR(S) : R.F. Marchetto et al.

It is certified that error appears in the above-indentified patent and that said Letters Patent is hereby corrected as shown below:

| COLUMN | LINE | |
|---|---|---|
| 1 | 40 | "carder" should read --carrier-- |
| 6 | 58 | "flame," should read --frame,-- |
| 7 | 8 | "Simulcast" should read --simulcast-- |
| 7 | 63-64 | "Channel" should read --channel-- |
| 13 | 30 | "chapel" should read --channel-- |
| 13 | 45 | "$E_{vu}(K,n)$" should read --$R_{vu}(K,n)$-- |
| 13 | 66 | "[R(w)].'" should read --[R(vv)].-- |
| 14 | 5 | "potion" should read --portion-- |
| 14 | 8 | "[W]=[V(*opt*)][V]" should read --[W]=[F(opt)][V]-- |
| 16 | 51 | "carded" should read --carried-- |

Signed and Sealed this

Ninth Day of September, 1997

Attest:

BRUCE LEHMAN

*Attesting Officer*         Commissioner of Patents and Trademarks